(12) United States Patent
Stefanko

(10) Patent No.: US 9,908,717 B2
(45) Date of Patent: Mar. 6, 2018

(54) NON CONTACT ACTIVE CONTROL CONVEYING ASSEMBLY

(71) Applicant: Rexnord Industries, LLC, Milwaukee, WI (US)

(72) Inventor: Justin Michael Stefanko, Pewaukee, WI (US)

(73) Assignee: REXNORD INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 15/053,743

(22) Filed: Feb. 25, 2016

(65) Prior Publication Data

US 2016/0251169 A1   Sep. 1, 2016

Related U.S. Application Data

(60) Provisional application No. 62/121,111, filed on Feb. 26, 2015.

(51) Int. Cl.
*B65G 17/40* (2006.01)
*B65G 39/20* (2006.01)
*B65G 47/26* (2006.01)

(52) U.S. Cl.
CPC ........... *B65G 47/261* (2013.01); *B65G 17/40* (2013.01); *B65G 39/20* (2013.01); *B65G 47/268* (2013.01)

(58) Field of Classification Search
CPC .......................... B65G 13/075; B65G 47/261
USPC ......................................... 198/779, 850–853
See application file for complete search history.

(56) References Cited

U.S. PATENT DOCUMENTS

| | | | |
|---|---|---|---|
| 3,610,406 A | * | 10/1971 | Fleischauer ........... B65G 47/261 193/35 A |
| 3,621,982 A | | 11/1971 | Fleischauer et al. |
| 3,653,489 A | | 4/1972 | Tullis et al. |
| 3,894,627 A | | 7/1975 | Jabbusch et al. |
| 4,006,815 A | | 2/1977 | Werntz |
| 4,168,009 A | * | 9/1979 | Ide ......................... B66B 11/006 198/475.1 |
| 4,231,469 A | | 11/1980 | Arscott |
| 4,262,794 A | * | 4/1981 | Bourgeois .............. B65G 17/24 198/459.8 |
| 4,821,169 A | | 4/1989 | Sites et al. |
| 4,880,107 A | | 11/1989 | Deal |
| 5,096,050 A | | 3/1992 | Hodlewsky |
| 6,148,989 A | * | 11/2000 | Ecker ..................... A23N 15/00 118/24 |

(Continued)

FOREIGN PATENT DOCUMENTS

| | | |
|---|---|---|
| CH | 439093 A | 6/1967 |
| DE | 102010014930 A1 | 10/2011 |

(Continued)

OTHER PUBLICATIONS

PCT International Search Report and Written Opinion, PCT/US2015/058309, dated Jan. 20, 2016.

(Continued)

*Primary Examiner* — Douglas Hess
(74) *Attorney, Agent, or Firm* — Quarles & Brady LLP

(57) ABSTRACT

An accumulation system for a conveyor that supports an object for movement along a path. The accumulation system including a clutch mechanism that selectively manipulates the operation of the conveyor via eddy currents to affect the movement of the object.

20 Claims, 9 Drawing Sheets

(56) References Cited

U.S. PATENT DOCUMENTS

| | | | |
|---|---|---|---|
| 6,923,309 B2* | 8/2005 | Costanzo | B65G 47/2445 198/411 |
| 7,040,480 B2* | 5/2006 | Sedlacek | B65G 17/24 198/457.02 |
| 7,311,192 B2 | 12/2007 | Fourney | |
| 7,360,641 B1* | 4/2008 | Fourney | B65G 17/24 198/779 |
| 7,426,992 B2 | 9/2008 | Fourney | |
| 7,537,105 B2 | 5/2009 | Fourney | |
| 7,578,384 B2* | 8/2009 | Fandella | B65G 17/08 198/779 |
| 7,861,849 B2 | 1/2011 | Fourney | |
| 8,151,978 B2* | 4/2012 | Wieting | B65G 17/32 198/779 |
| 8,342,313 B2 | 1/2013 | Wargo et al. | |
| 8,511,460 B2* | 8/2013 | Ragan | B65G 17/24 198/449 |
| 8,607,965 B2* | 12/2013 | Sejourne | B65G 13/075 193/35 A |
| 8,622,202 B2* | 1/2014 | Rau | B65G 17/24 198/779 |
| 8,678,179 B2* | 3/2014 | Kaes | B65G 15/48 198/779 |
| 8,746,442 B2* | 6/2014 | Schwai | B65G 17/24 193/37 |
| 8,887,898 B2* | 11/2014 | Sejourne | B65G 13/075 193/35 A |
| 9,108,801 B2* | 8/2015 | Costanzo | B65G 17/24 |
| 9,227,785 B2* | 1/2016 | Chinnock | B65G 17/24 |
| 9,371,194 B2* | 6/2016 | Ragan | B65G 17/345 |
| 9,428,338 B2* | 8/2016 | Ragan | B65G 17/24 |
| 2002/0134643 A1 | 9/2002 | Schmale et al. | |
| 2008/0121498 A1 | 5/2008 | Costanzo et al. | |
| 2009/0090599 A1 | 4/2009 | Fourney | |
| 2012/0285799 A1 | 11/2012 | Fourney | |
| 2014/0116853 A1 | 5/2014 | Chinnock et al. | |

FOREIGN PATENT DOCUMENTS

| NL | 1021991 C2 | 5/2004 |
|---|---|---|
| WO | 2016070000 A1 | 5/2016 |
| WO | 2016070042 A1 | 5/2016 |
| WO | 2016137795 A1 | 9/2016 |

OTHER PUBLICATIONS

PCT International Search Report and Written Opinion, PCT/US2015/058243, dated Jan. 22, 2016.
PCT International Search Report and Written Opinion, PCT/US2016/018230, dated Apr. 22, 2016.
Bastian Solutions, Zero Pressure Roller Conveyor, http://store.bastiansolutions.com/equipment/category.aspx/131/downloads/steelking/Zero-Pressure-Roller-Conveyor-C6.aspx, Printed 2017.
Hytrol, EZLogic(R) Accumulation System, http://web.archive.org/web/20170107110757/http://www.hytrol.com/web/index.php/solutions/by-product/ezlogic, Jan. 7, 2017, 6 pages. [from archive.org].
Hytrol Conveyor Company, Zero Pressure Accumulation Roller Conveyor—Model ABEZ, https://www.youtube.com/watch?v=aOF_BWmbhKc, Published on Apr. 29, 2014.
Interroll Group, Drive Types for Conveyor Rollers, https://web.archive.org/web/20140912202558/http://www.interroll.com/en/interroll-group/products/conveyor-rollers/technical-information/drives/drives.php, Sep. 12, 2014, 1 page [from archive.org].
Interroll, Drives and Controls—Products, https://www.interroll.us/products/drives-and-controls/, Printed Sep. 27, 2017, 7 pages.
Interroll, 24 VDC Products, Roller Drives & Drive Control Card, Product Information, Printed Sep. 27, 2017, 12 pages.
Interroll, Conveyor Solutions, Rollers & 24 Volt DC RollerDrive, Product Information, Apr. 2015, 17 pages.
Intralox, ARB Case Turners: ARB Case Turner Rotates and Aligns Nearly All Products in a Small Footprint, http://web.archive.org/web/20140907075640/http://www.intralox.com/case-turners.aspx, Sep. 7, 2014, 2 pages. [from archive.org].
Intralox, ARB Merges: ARB Merge Conveyors Ensure Reliable, Accurate Product Positioning, https://web.archive.org/web/20141005193214/http:/www.intralox.com:80/merges.aspx, Oct. 5, 2014 [from archive.org].
Shuttleworth, Positioning & Orienting Conveyors—Rotate, Invert, Up-End Product Conveying, http://www.shuttleworth.com/products/solutions-by-application/positioning-orienting-conv. . . , Printed Jul. 14, 2017, 2 pages.
Vande Berg Scales, Indexing Conveyors, http://vbssys.com/indexing-conveyor/, Copyright 2015 VBS, Inc., 2 pages.

* cited by examiner

NON CONTACT ACTIVE CONTROL CONVEYING ASSEMBLY

CROSS REFERENCES TO RELATED APPLICATIONS

This application claims the benefit of U.S. Provisional Patent Application No. 62/121,111 filed on Feb. 26, 2015. This application includes subject matter related to U.S. patent application Ser. No. 14/061,884 filed on Oct. 24, 2013, which claims the benefit of U.S. Provisional Patent Application No. 61/718,229 filed on Oct. 25, 2012. This application also includes subject matter related to U.S. Provisional Patent Application No. 62/073,495, filed on Oct. 31, 2014, and U.S. Provisional Patent Application No. 62/073,276 filed on Oct. 31, 2014. The entire contents of all the above listed applications are incorporated herein by reference.

BACKGROUND OF THE INVENTION

The present invention relates to modular conveyor belts and chains, and more particularly to an active control roller top conveyor module and a modular conveying assembly including at least one of the conveyor modules.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel.

Modular belts can transport products in the direction of conveyor travel, but have difficulty accumulating a product to reduce backline pressure. In addition, the belt can easily damage high friction products during accumulation. One known solution to this problem is to rotatably mount rollers directly on the hinge pin connecting modules together, such that the hinge pin supports the rollers between hinge members. The roller rotates about an axis of rotation that is substantially coaxial with the hinge pin axis. Because it is necessary to have a portion of the roller extend above the module to engage the object being conveyed to reduce backline pressure, the required roller diameter is determined by the hinge pin location and the height of the module. Unfortunately, this often results in requiring a large diameter roller that extends both above and below the module when that configuration is not always desired. Moreover, supporting the roller on the pin alone can result in undesirable pin wear.

Another known solution for reducing backline pressure is disclosed in U.S. Pat. No. 4,231,469 issued to Arscott. In Arscott, rollers are supported by roller cradles between modules. The rollers extend above the cradle for rolling contact with an object being conveyed independent of the location of the hinge pins. The rollers reduce friction between the belt and the object. Unfortunately, assembling the roller in the cradle is difficult, requiring insertion of the roller into the cradle, and then slipping an axle or two stub axles through holes formed through the cradle walls and into the roller. The axle must then be secured to prevent it from slipping out of one of the holes formed in the cradle wall.

Rexnord Industries, LLC of Milwaukee, Wis. developed roller top conveying modules that include roller axle supports that support freewheeling rollers above a module top surface. See U.S. Pat. Nos. 8,151,978, 5,096,050, 4,880,107, and 4,821,169. These modules are easily assembled and do not require oversize rollers extending through the conveyor modules. These prior art modules allow accumulation of product being conveyed by a conveying system formed from modules by providing a low backline pressure when the products are stopped on the moving modules. Absent individual external stops for each product being conveyed, the conveyed products engage other products when accumulating on the conveyor system.

SUMMARY OF THE INVENTION

One embodiment provides a conveying assembly that includes a plurality of modules including a body having a top surface, a driven axle mounted to the body for conveyance therewith, a roller fixed to the driven axle, and a rotor fixed to the driven axle. An electromagnet defines a gap through which the rotor is sized to pass, and is arranged to be selectively energized such that a magnetic field is produced through the gap. The electromagnet and the rotor are configured such that an eddy current is formed in the rotor as the rotor passes through the gap to affect rotation of the driven axle.

Another embodiment provides a conveying assembly that includes a continuous belt of modules arranged for conveyance along a path, each module including a roller arranged to support an object. The conveying assembly also includes an accumulation zone defined along the path and arranged to interact with the modules via eddy current braking to affect the movement of the object along the path.

Yet another embodiment provides an accumulation system for a conveyor that supports an object for movement along a path. The accumulation system includes a clutch mechanism that selectively manipulates the operation of the conveyor via eddy currents to affect the movement of the object.

DETAILED DESCRIPTION OF PREFERRED EMBODIMENTS

Figure 1:
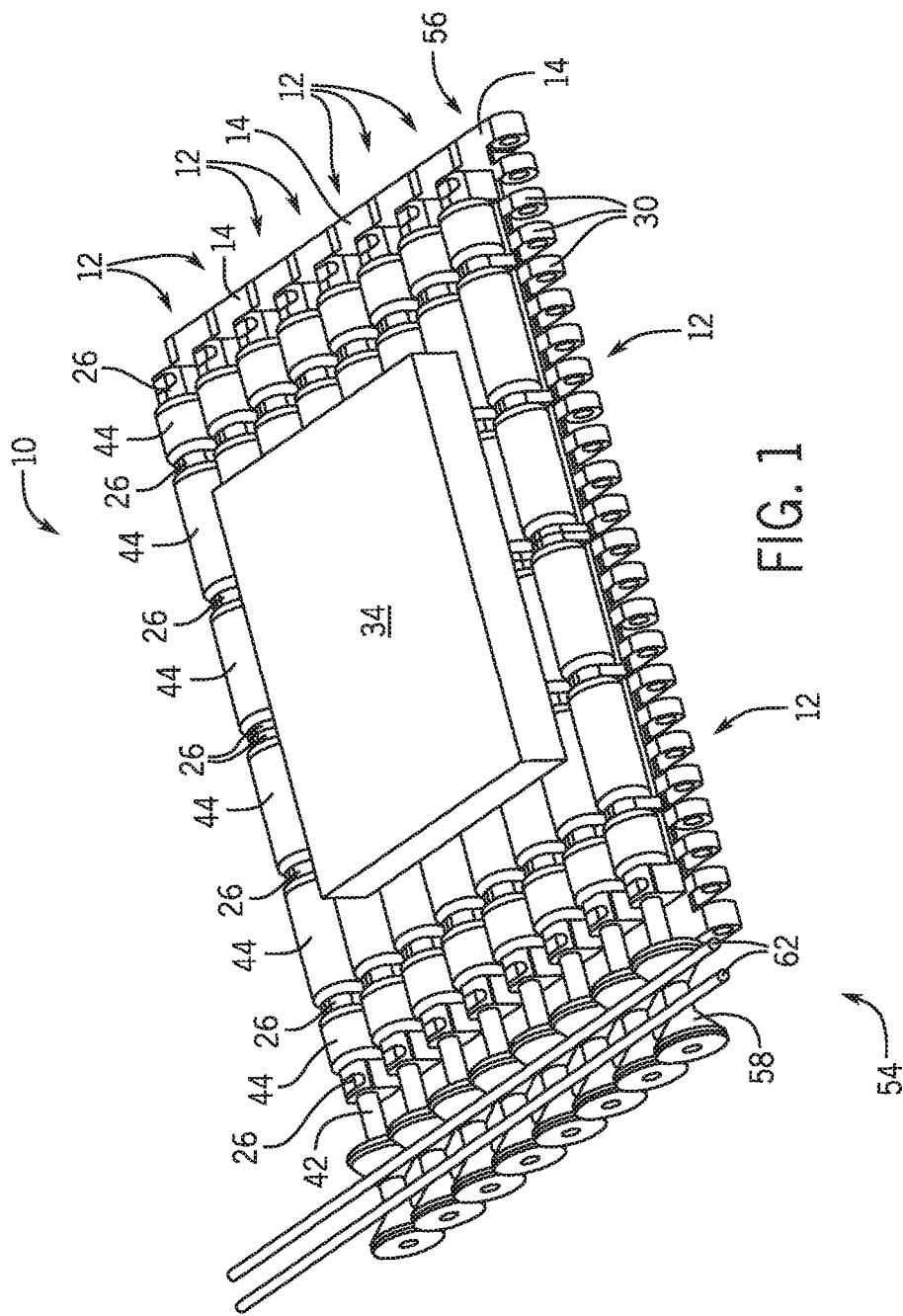
FIG. 1 is a pictorial view of a modular conveyor belt assembly according to one aspect.

A modular conveying assembly, or belt 10, shown in FIG. 1, includes a plurality of belt modules 12 assembled in an edge to edge relation to form the continuous belt 10. Hinge pins 40 (see FIG. 2) join adjacent modules 12, and pivotally connect the adjacent modules 12 in the direction of belt travel. Roller axle supports 26 extending upwardly from a module body 14 of each belt module 12 support a roller axle 42 (see FIG. 2) having a plurality of rollers 44 fixed thereto. The rollers 44 rotatably engage an object 34 being conveyed by the belt 10 to reduce friction between the belt 10 and the object and, as described below, selectively convey the object relative to the module body 14. The modules 12 are preferably formed using methods known in the art, such as injection molding, from materials known in the art, such as acetal, polyethylene, polypropylene, nylon, and the like.

Figure 3:
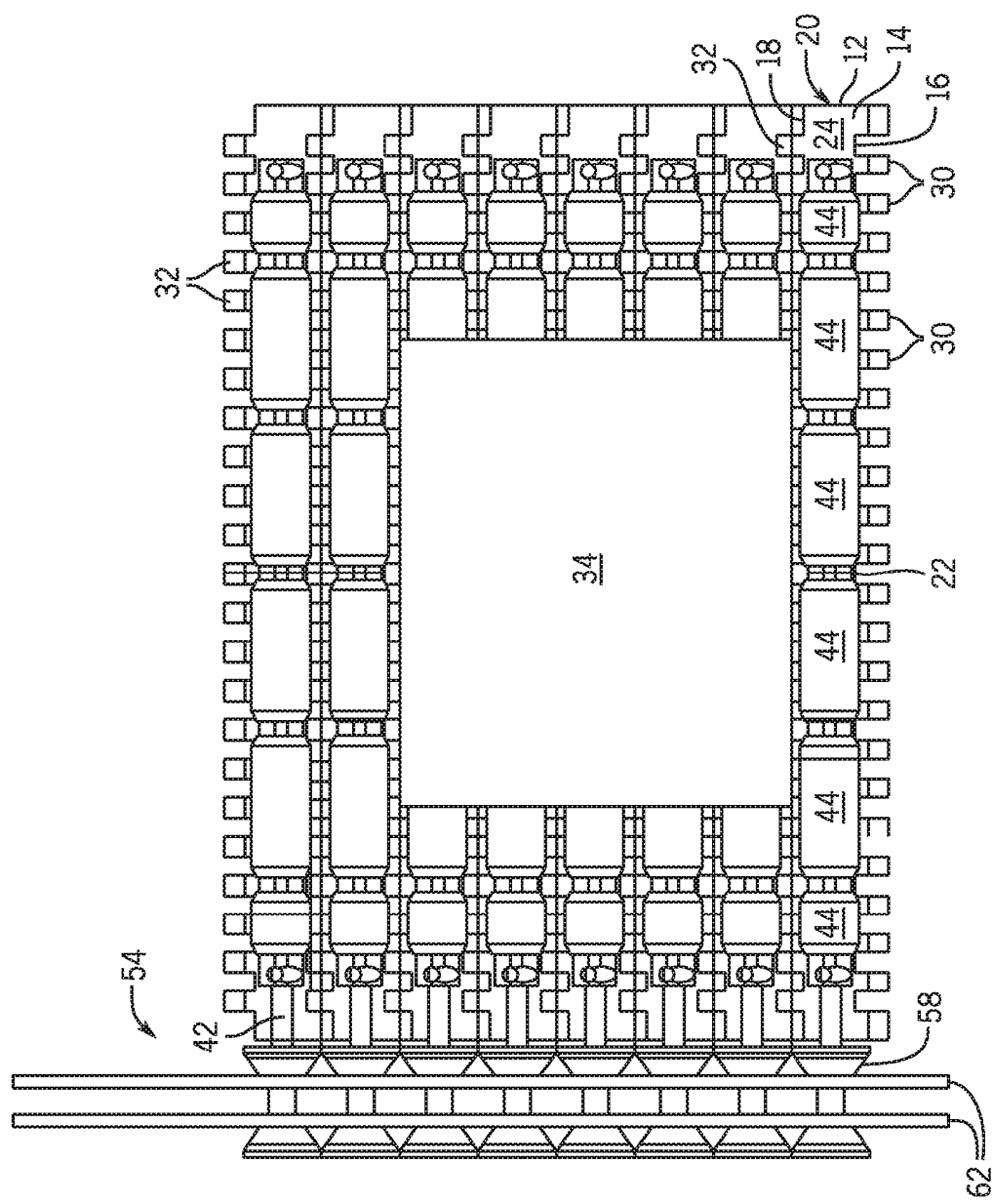
FIG. 3 is a top view of the assembly shown FIG. 1.

Each module 12 includes a body 14 having a top surface 24 (see FIG. 3) surrounded by a leading edge 16 and trailing edge 18 joined by a first side edge 20 and a second side edge 22. Although, the terms "leading" and "trailing" are used to identify features of the module 12, the module 12 described herein can be used in any direction, or orientation without departing from the scope of the invention. Advantageously, the top surface 24 can prevent products from falling through the belt 10. Of course, the top surface 24 can also have perforations to allow air or fluid flow for cooling, drafting, and/or draining. The module body 14 has a width which is defined by the distance between the side edges 20, 22, and a length which is defined by the distance between the leading and trailing edges 16, 18.

Figure 2:
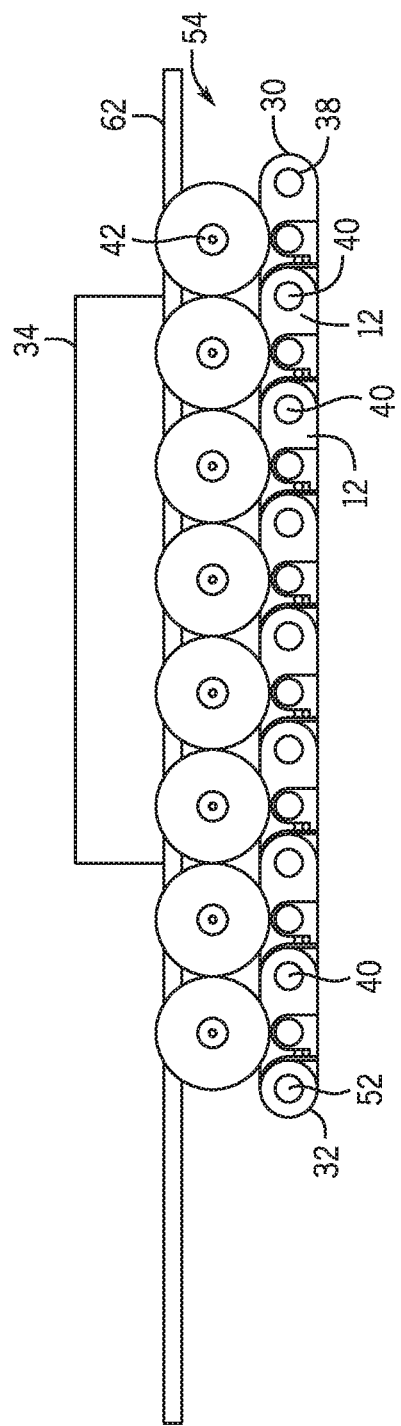
FIG. 2 is a side view of the assembly shown in FIG. 1.

With reference to FIG. 2, each leading edge hinge member 30 extends forwardly from the leading edge 16 of the module body 14, and includes a coaxial opening 38 for receiving the hinge pin 40. Each leading edge hinge member opening 38 receives the hinge pin 40 pivotally connecting the leading edge hinge members 30 of one module 12 to trailing edge hinge members 32 of an upstream module 12. The leading edge hinge members 30 intermesh with trailing edge hinge members 32 extending rearwardly from the trailing edge 18 also include coaxial openings 52. The trailing edge hinge members 32 include coaxial openings 52 that receive the hinge pin 40 to pivotally connect the trailing edge hinge members 32 of the module 12 to leading edge hinge members 30 of a downstream module 12.

The roller axle supports 26 are spaced across the module top surface 24 in a row 56 transverse to the direction of conveyor travel. Each axle support 26 includes a coaxial opening 46 for receiving the roller axle 42. Advantageously, the plurality of axle supports 26 do not allow the roller axle 42 to pop upwardly away from the modules 12 if the roller 44 or roller axle 42 catches an object. Although a plurality of axle supports 26 in a single row on each module 12 is shown, a single axle support extending upwardly from the module top surface forming a row or a plurality of axle support rows on a single module can be provided without departing from the scope of the invention.

The roller axle 42 can be formed from any material, such as a polymeric material, metal, and the like. Polymeric roller axles 42 are preferred because they are lighter and produce less noise. Each roller axle 42 supports a plurality of the rollers 44. Preferably, a single roller 44 is disposed between a pair of axle supports 26, however, a plurality of rollers 44 can be provided between a pair of axle supports 26 without departing from the scope of the The rollers 44 support the object 34 being conveyed by the belt 10 above the module body 14 and are rotatably fixed to the roller axle 42. At least a portion of each roller 44 extends above the roller axle supports 26 to engage the object being conveyed by the belt 10. Preferably, each roller 44 is molded from a plastic, and includes a through hole 46 formed there through for receiving the roller axle 42. The rollers 44 can be rotatably fixed to the roller axle 42 using methods known in the art, such as by chemically bonding the roller 44 to the axle 42, fusing the roller 44 to the roller axle 42, integrally forming the roller axle 42 and roller 44 as a single piece, forming a through hole axially through the roller 44 with a noncircular cross section and inserting the roller axle 42 having a complementary cross section through the roller 44 through hole, and the like without departing from the scope of the invention. Although a plastic roller is disclosed, the roller can be formed from any material, such as elastomers, metals, and the like, suitable for the particular application without departing from the scope of the invention.

The roller axle 42, and thus the rollers 44 are selectively rotatably driven to accumulate objects on the conveyor system without excessive product to product contact and/or to selectively space objects conveyed by the conveying system. In the embodiment shown in FIGS. 1-4, the roller axle 42 is actively driven by a clutch 54 having a driven surface 58 fixed to one end of the roller axle 42 and a fixed driving member 62, or bar, adjacent the belt 10. The driving member 62 engages the driven surface 58 to rotatably drive the roller axle 42, and thus the roller 44. In a preferred embodiment, movement of the conveyor module 12 relative to the fixed driving member 62 engaging the driven surface 58 of the clutch 54 causes the driven surface 58, and thus, the roller axle 42 and rollers 44 to rotate.

Figure 4:
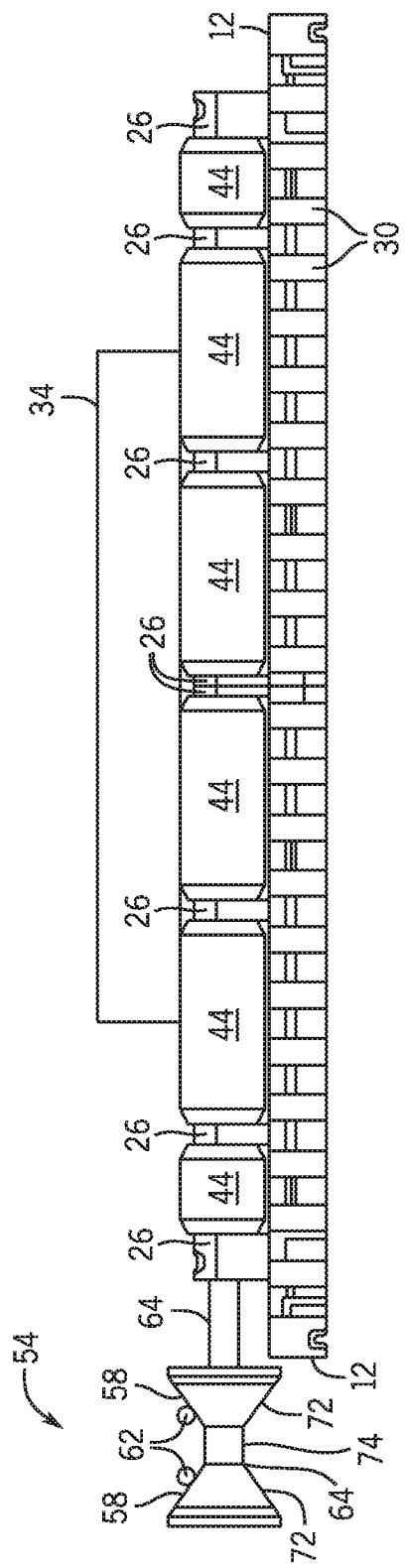
FIG. 4 is a front view of the assembly shown FIG. 1.

In the embodiment disclosed in FIGS. 1-4, the driven surface 58 is formed having two conical driven surfaces 72 forming part of two cones joined at their apex by a cylindrical driven surface 74 (see FIG. 4). The driven surface 58, however, can be any shape compatible with the driving member without departing from the scope of the invention.

The driving member 62 is at least one bar positioned adjacent modules 12 of the belt 10 and arranged in a direction extending in the conveying direction. The driving member 62 is fixed relative to the conveying direction of the modules 12 and selectively engageable with the different locations on the driven surface 58 to rotatably drive the roller axle. In one embodiment, the driving member 62 is selectively lowered into engagement with the driven surface 58. In another embodiment, multiple driving members 62 are disposed above the driven surface 58 and one of the driving members 62 is selectively engaged with the driven surface 58 depending upon the desired rotational speed of the roller axle 42. Although a driving member 62 fixed relative to the conveying direction of the modules 12 is shown, the driving member can be movable relative to the conveying direction of the modules, such as an endless driven belt engaging the driven surface, without departing the scope of the invention.

The belt 10 is assembled by intermeshing the trailing edge hinge members 32 of one of the modules 12 with the leading edge hinge members 30 of the adjacent module 12, such that the trailing hinge member openings 52 of the one module 12 are aligned with and the leading edge hinge member openings 38 of the other module 12. A hinge pin 40 is then slipped through the aligned hinge member openings 38, 52 to pivotally link the adjacent modules 12 together.

Figure 5:
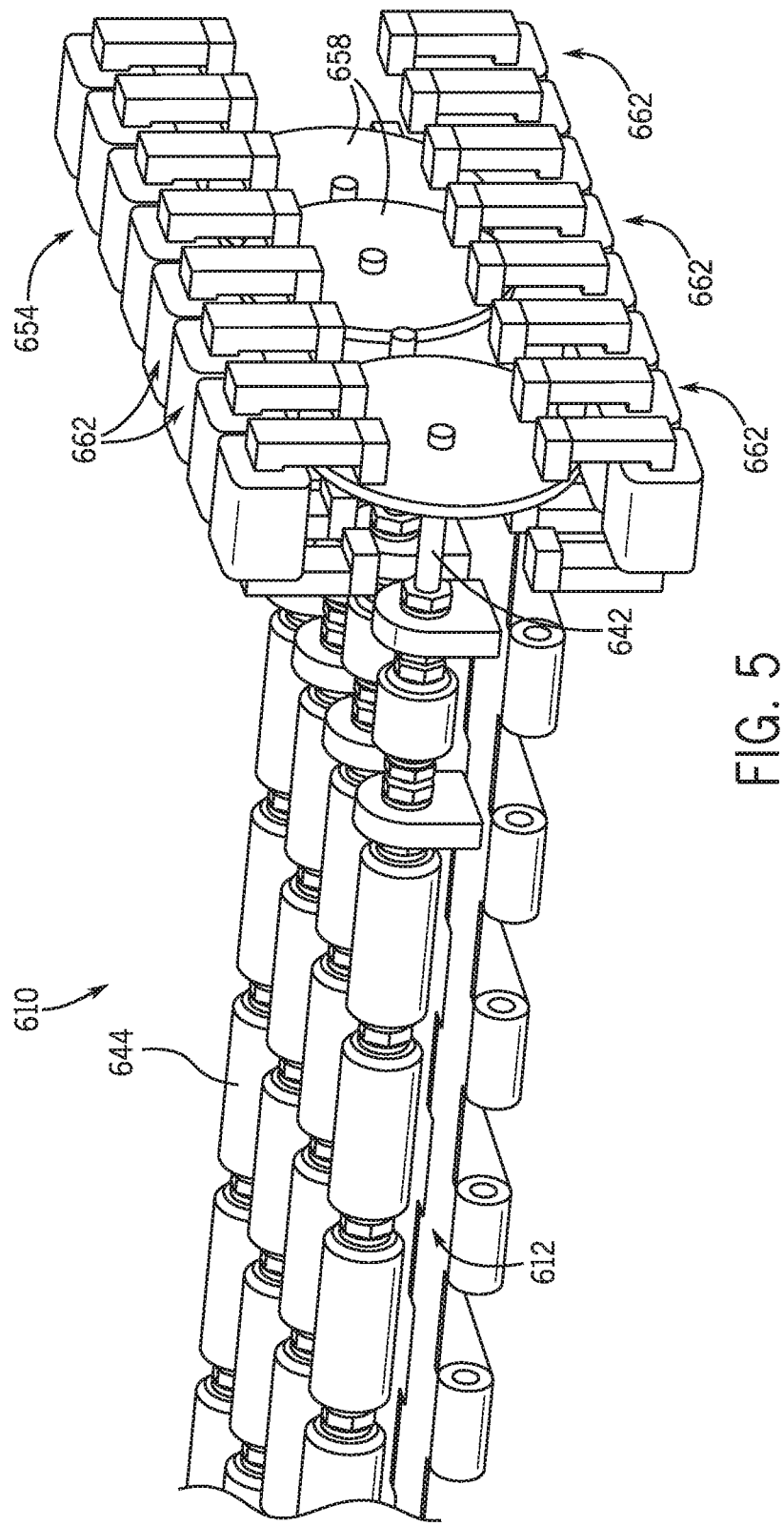
FIG. 5 is a pictorial view of a modular conveyor belt assembly according to another aspect.

FIG. 5 shows another belt 610 that is similar to the belt 10 discussed above but includes a different clutch 654. Like components of the belt 610 discussed below will be labeled with like numbers to the above description but in the 600 series.

The clutch 654 includes a driven surface in the form of a rotor 658, and a driving member in the form of an electromagnet 662. The clutch 654 operates on the principal of circular eddy current brakes. Each module 612 includes a rotor 658 arranged to rotate with the roller axle 642, and a bank of a plurality of electromagnets 662 are mounted in a stationary position along a desired area of the belt 610. The bank of electromagnets 662 defines an accumulation zone.

Figure 6:
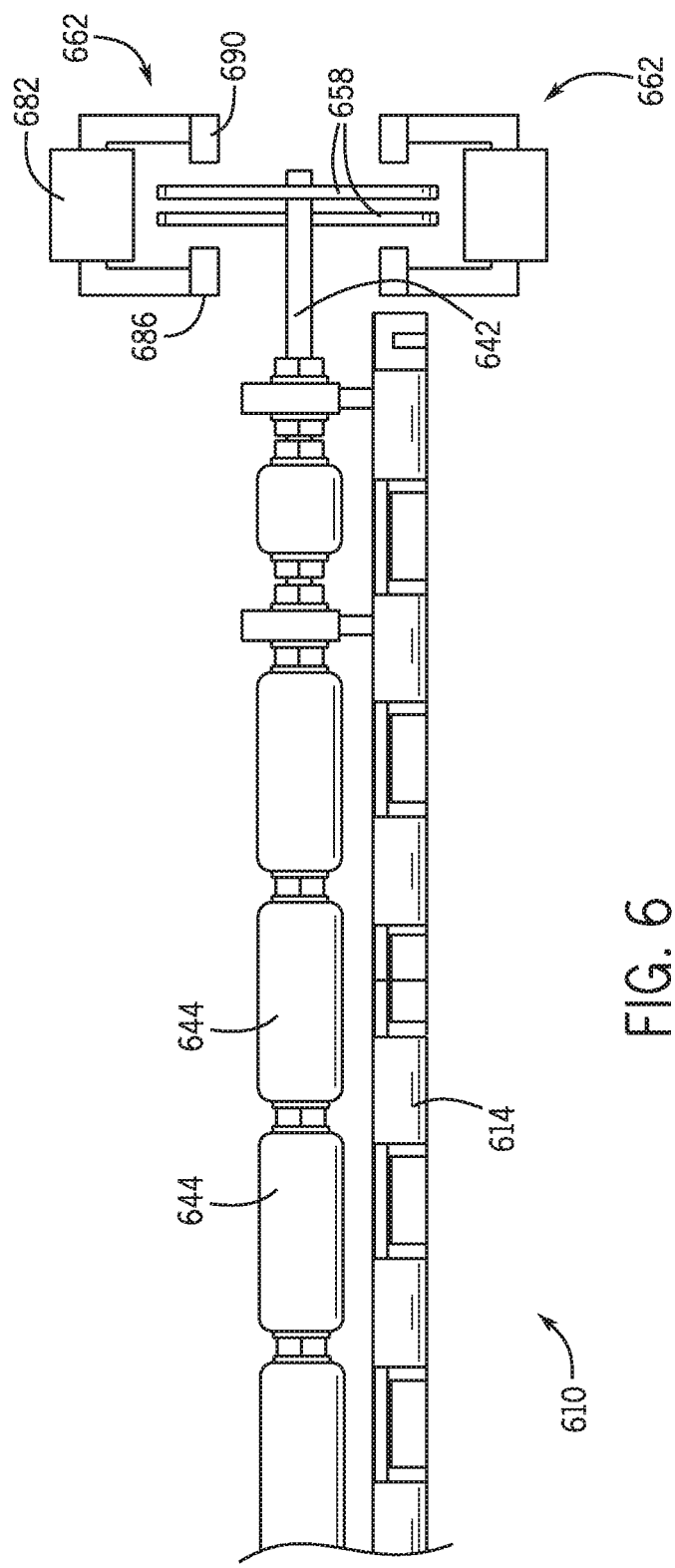
FIG. 6 is a front view of the assembly of FIG. 5.
Figure 7:
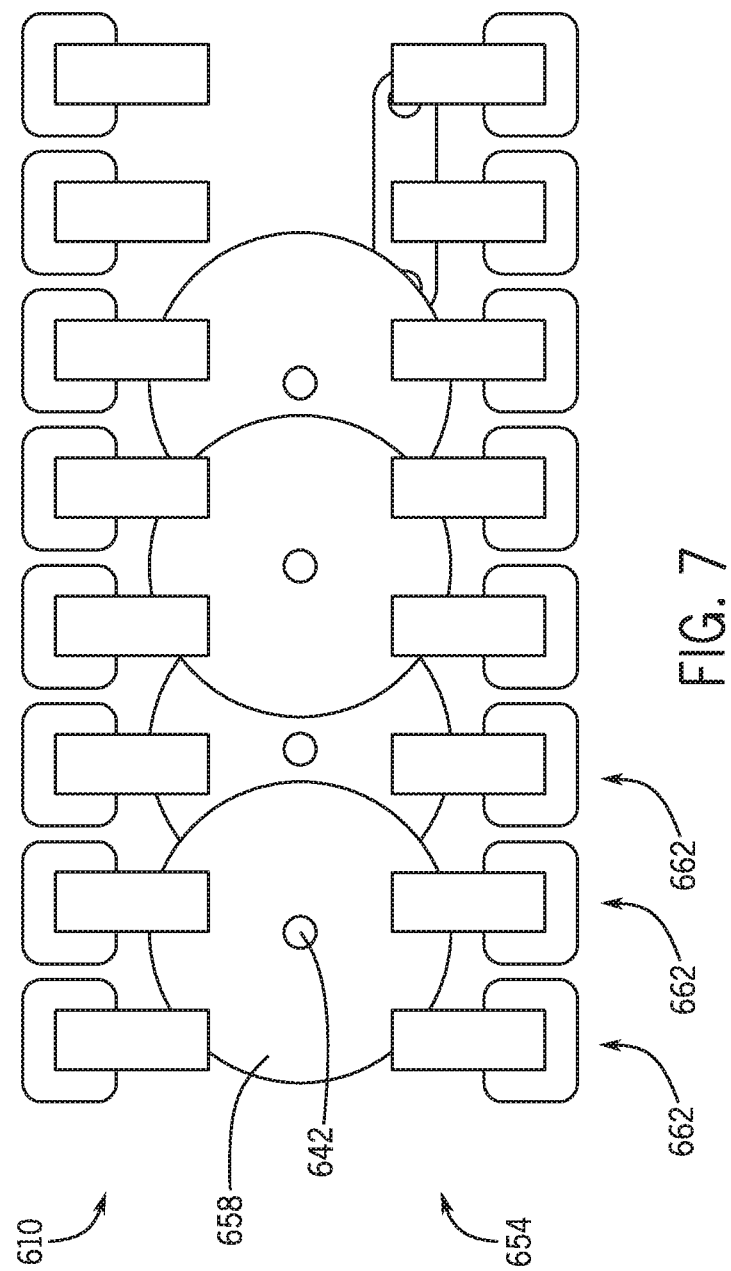
FIG. 7 is a side view of the assembly of FIG. 5.

The rotors 658 are generally circular disks formed of a ferrous material and rigidly coupled to the roller axle 642 (e.g., by a keyway, spline, setscrew, D-shank, et cetera). The rotors 658 may include heat dissipation features, such as venting, or internal passageways configured to accept fluid flow therethrough (e.g., liquid coolant, or air). As shown most clearly in FIG. 6, adjacent modules 612 include rotors 658 that are offset in a direction parallel to the roller axle 642 such that the rotors 658 do not interfere with one another or any adjacent roller axles 642. The rotors 658 are sized to inhibit contact or interference with the components of an adjacent module 612.

Each electromagnet 662 includes a winding 682, a north pole 686, and a south pole 690. The north pole 686 is spaced apart from the south pole 690 by a gap sized to receive the rotors 658 therebetween. Again turning to FIG. 6 the gap is sized to receive two adjacent rotors 658 that are offset from one another, such that the belt 610 may pass through the bank of electromagnets 662 uninhibited.

Operation of the belt 610 is generally similar to the operation of the above described belt 10 and will not be discussed in detail. Rather, the below discussion will focus on the clutch 654 and the use of eddy current braking to provide a zero pressure accumulation system or to affect rotation of the rollers 644 as desired.

In operation, the belt 610 operates normally and the rotor 658 of an individual module 612 of the belt 610 moves through the area where the electromagnets 662 are positioned. If it is determined that the clutch 654 should be engaged to accumulate, power is provided to the windings 682 of the electromagnets 662. A magnetic field is then formed between the north pole 686 and the south pole 690 with the rotor 658 passing therethrough.

As the rotor 658 passes through the gap of an energized electromagnet 662, eddy currents are induced within the rotor 658 and cause the rotor 658 to tend to remain stationary. The engagement of the electromagnets 662 and the rotors 658 via eddy currents in concert with the movement of the belt 610 along the path causes relative rotation of the roller axle 642 similar to the effect caused by the clutch 54 discussed above.

As will be apparent to those skilled in the art upon review of this application, the bank of electromagnets 662 allows the operator of the conveyor belt 610 to have precision control of the accumulation zone. A controller may be utilized to provide actuation energy in controlled pulses or patterns to effect desired motion profiles of the rollers 644.

Figure 8:
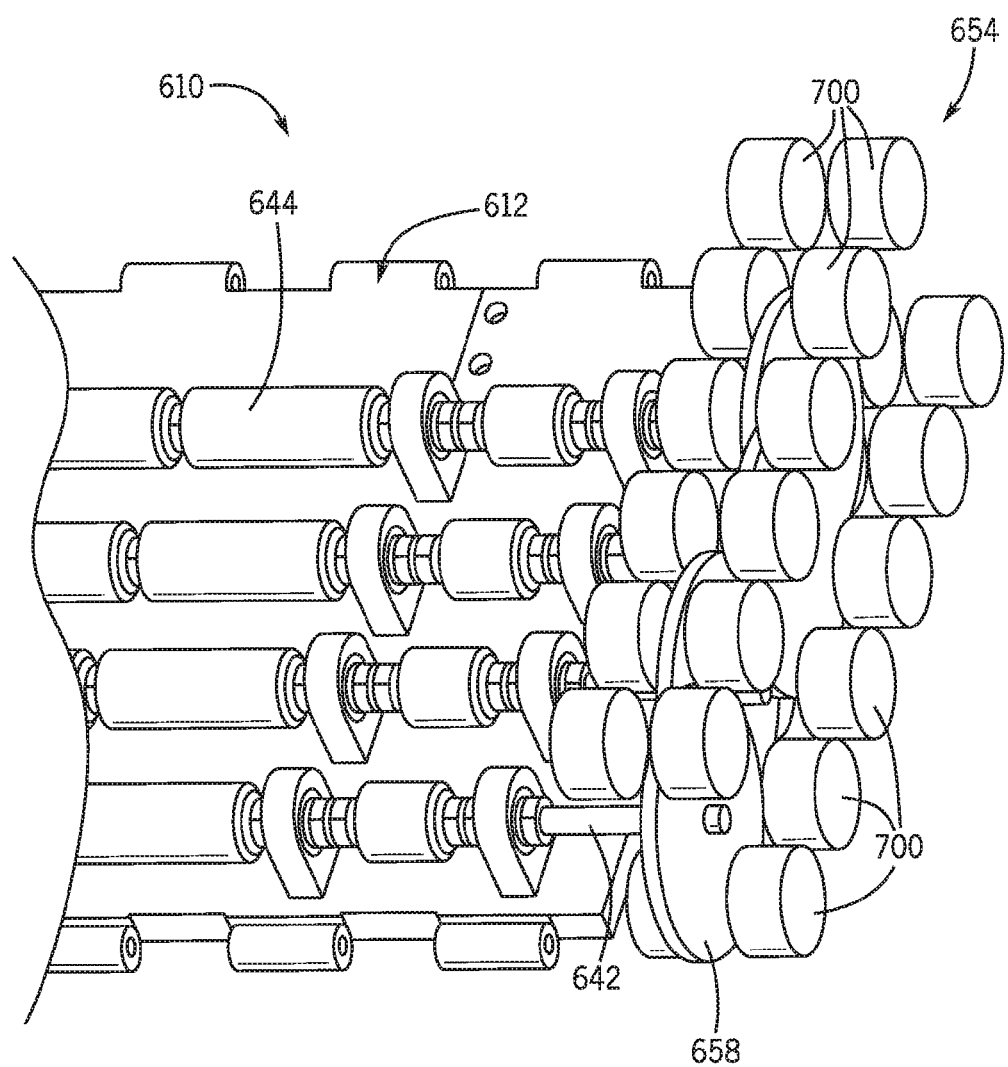
FIG. 8 is a pictorial view of a modular conveyor belt assembly according to another aspect.
Figure 9:
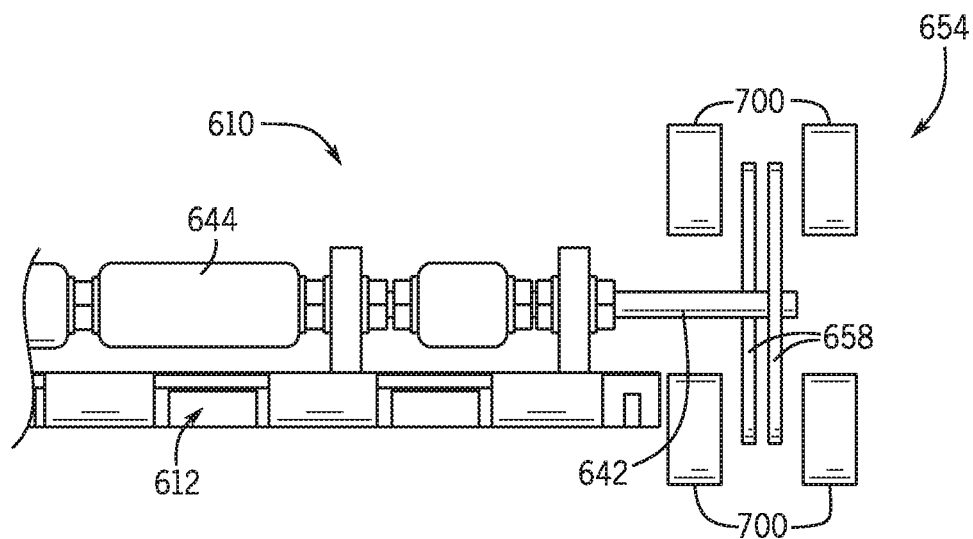
FIG. 9 is a front view of the assembly of FIG. 8 in a first arrangement.
Figure 10:
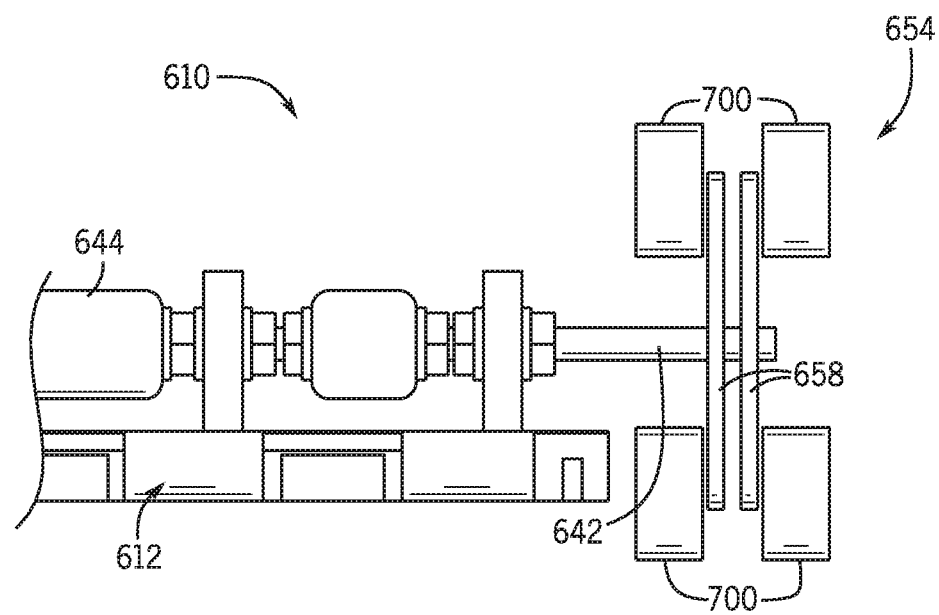
FIG. 10 is a front view of the assembly of FIG. 8 in a second arrangement.

FIG. 8 shows the belt 610 with the electromagnets 662 replaced with permanent magnets 700. Similar to the arrangement described above, the bank of permanent magnets 700 defines an accumulation zone. Control of the strength of the magnetic field and the resulting strength of the induced eddy currents in the rotors 658 is controlled by adjusting an air-gap defined between the permanent magnets 700 and the rotors 658. For example, FIG. 9 shows the clutch 654 with a first air-gap and FIG. 10 shows the clutch 654 with a second air-gap that applies stronger eddy currents.

In operation, the belt 610 operates normally and the rotor 658 of an individual module 612 of the belt 610 moves through the area where the permanent magnets 700 are positioned. As the rotor 658 passes through the air-gap of the permanent magnets 700, eddy currents are induced within the rotor 658 and cause the rotor 658 to tend to remain stationary. The engagement of the permanent magnets 700 and the rotors 658 via eddy currents in concert with the movement of the belt 610 along the path causes relative rotation of the roller axle 642 similar to the effect caused by the clutch 54 discussed above.

The clutch 654 utilizing eddy current braking technology may be adapted for use with any of the embodiments discussed in U.S. patent application Ser. No. 14/061,884 filed on Oct. 24, 2013. Alternatively, a linear eddy current braking system could be utilized to provide a zero-pressure accumulation zone or the driven surface of each module 612 may include electromagnets or permanent magnets and the driving member may be a rail placed within the accumulation zone.

While there has been shown and described what are at present considered the preferred embodiments of the invention, it will be obvious to those skilled in the art that various changes and modifications can be made therein without departing from the scope of the invention defined by the appended claims. For example, the individual features described in the drawings may include one or more features from another embodiment.

I claim:

1. A conveying assembly comprising:
   a plurality of modules including
      a body having a top surface,
      a driven axle mounted to the body for conveyance therewith,
      a roller fixed to the driven axle, and
      a rotor fixed to the driven axle; and
   an electromagnet defining a gap through which the rotor is sized to pass, the electromagnet arranged to be selectively energized such that a magnetic field is produced through the gap, the electromagnet and the rotor configured such that an eddy current is formed in the rotor as the rotor passes through the gap to affect rotation of the driven axle.

2. The conveyor assembly of claim 1, wherein the rotor is formed of a ferrous material.

3. The conveyor assembly of claim 1, wherein the rotor is a generally circular disk.

4. The conveyor assembly of claim 1, wherein each rotor is arranged to not interfere with the operation of any adjacent rotors.

5. The conveyor assembly of claim 1, wherein the electromagnet is arranged above the top surface of the body.

6. The conveyor assembly of claim 1, wherein the electromagnet is arranged below the top surface of the body.

7. The conveyor assembly of claim 1, further comprising another electromagnet configured to affect rotation of the driven axle.

8. The conveyor assembly of claim 1, wherein the electromagnet is one of a plurality of electromagnets arranged in a bank to define an accumulation zone.

9. A conveying assembly comprising:
   a continuous belt of modules arranged for conveyance along a path, each module including a roller arranged to support an object; and
   an accumulation zone defined along the path and arranged to interact with the modules via eddy current braking to affect the movement of the object along the path.

10. The conveying assembly of claim 9, wherein each module includes a body having a top surface, a driven axle mounted to the body for conveyance therewith, a roller fixed to the driven axle, and a rotor fixed to the driven axle.

11. The conveying assembly of claim 10, wherein the accumulation zone includes a bank of magnets, each magnet defines a gap sized to receive the rotors of the continuous belt.

12. The conveying assembly of claim 11, wherein the magnets are electromagnets and when energy is provided to the electromagnets and eddy current is formed in the rotors and causes the driven axle to rotate.

13. The conveying assembly of claim 11, wherein the magnets are electromagnets and each electromagnet is individually controlled to affect the movement of the object.

14. The conveying assembly of claim 11, wherein the magnets are permanent magnets.

15. The conveying assembly of claim 14, wherein adjusting the gap affects the strength of the eddy current.

16. An accumulation system for a conveyor having a plurality of modules with respective rollers supported by the plurality of modules that support an object for movement along a path, the accumulation system comprising:
a clutch mechanism that selectively manipulates the operation of the respective rollers via eddy currents as each of the plurality of modules pass through an accumulation zone along the path to affect the movement of the object.

17. The accumulation system of claim 16, wherein the clutch includes a driven surface coupled to the conveyor and a driving member that induces an eddy current in the driven surface.

18. The accumulation system of claim 17, wherein the driven surface includes a rotor fixed to a roller axle that supports the object for movement along the path.

19. The accumulation system of claim 17, wherein the driving member includes an electromagnet configured to produce a magnetic field.

20. The accumulation system of claim 17, wherein the driving member includes a permanent magnet configured to produce a magnetic field.

* * * * *

UNITED STATES PATENT AND TRADEMARK OFFICE
CERTIFICATE OF CORRECTION

| | |
|---|---|
| PATENT NO. | : 9,908,717 B2 |
| APPLICATION NO. | : 15/053743 |
| DATED | : March 6, 2018 |
| INVENTOR(S) | : Justin Michael Stefanko |

Page 1 of 1

It is certified that error appears in the above-identified patent and that said Letters Patent is hereby corrected as shown below:

In the Claims

Column 6, Claim 2, Line 36, "conveyor" should be --conveying--.

Column 6, Claim 3, Line 38, "conveyor" should be --conveying--.

Column 6, Claim 4, Line 40, "conveyor" should be --conveying--.

Column 6, Claim 5, Line 43, "conveyor" should be --conveying--.

Column 6, Claim 6, Line 45, "conveyor" should be --conveying--.

Column 6, Claim 7, Line 47, "conveyor" should be --conveying--.

Column 6, Claim 8, Line 50, "conveyor" should be --conveying--.

Signed and Sealed this
Thirtieth Day of July, 2019

Andrei Iancu
*Director of the United States Patent and Trademark Office*